US009760731B2

(12) United States Patent
Winslow et al.

(10) Patent No.: US 9,760,731 B2
(45) Date of Patent: Sep. 12, 2017

(54) CONFIGURABLE CROSS-DOMAIN INFORMATION ASSURANCE

(71) Applicant: L-3 Communications Corporation, New York, NY (US)

(72) Inventors: Richard Norman Winslow, Wilmington, DE (US); Frank Anthony Costantini, Woolwich Township, NJ (US); Steven Daniel Devlin, Pitman, NJ (US); Robert M. Smith, Sicklerville, NJ (US)

(73) Assignee: L3 TECHNOLOGIES, INC., New York, NY (US)

( * ) Notice: Subject to any disclaimer, the term of this patent is extended or adjusted under 35 U.S.C. 154(b) by 17 days.

(21) Appl. No.: 14/876,532

(22) Filed: Oct. 6, 2015

(65) Prior Publication Data

US 2017/0098094 A1 Apr. 6, 2017

(51) Int. Cl.
H04L 29/06 (2006.01)
G06F 21/62 (2013.01)
H04L 12/24 (2006.01)

(52) U.S. Cl.
CPC ........ *G06F 21/6218* (2013.01); *H04L 41/28* (2013.01); *H04L 63/0263* (2013.01); *H04L 63/12* (2013.01); *H04L 63/20* (2013.01)

(58) Field of Classification Search
CPC .............................. G06F 21/6218; H04L 63/08
See application file for complete search history.

(56) References Cited

U.S. PATENT DOCUMENTS

| | | | |
|---|---|---|---|
| 6,369,909 B1 * | 4/2002 | Shima | G06F 3/1206 358/1.13 |
| 6,584,508 B1 * | 6/2003 | Epstein | H04L 63/0263 709/225 |
| 7,383,285 B1 * | 6/2008 | Pal | G06F 17/30607 |
| 7,797,423 B2 * | 9/2010 | Holden | G06F 21/31 709/219 |
| 8,051,475 B2 | 11/2011 | Poore et al. | |
| 8,108,913 B2 * | 1/2012 | Weber | G06F 21/62 709/223 |
| 8,161,529 B1 | 4/2012 | Bortz et al. | |
| 8,769,127 B2 | 7/2014 | Selimis et al. | |
| 8,938,795 B2 | 1/2015 | Clarke et al. | |
| 8,959,045 B2 | 2/2015 | Patten et al. | |
| 2007/0204337 A1 | 8/2007 | Schnackenberg et al. | |

(Continued)

*Primary Examiner* — Shawnchoy Rahman
(74) *Attorney, Agent, or Firm* — Condo Roccia Koptiw LLP (57) ABSTRACT

Methods for configuring and utilizing a configurable data guard (CDG) implemented on a hardware-based programmable logic device are disclosed. The CDG may include integrated circuit portions comprising a plurality of arrays of generic comparison operations and a plurality of arrays of generic action operations. The CDG may receive a data guard configuration. The CDG may perform an authentication and integrity check procedure on the received data guard configuration. The CDG may configure a plurality of guard primitives based on the data guard configuration. Each guard primitive may be configured from at least one generic comparison operation and at least one generic action operation. The guard primitives may be used to enforce the complex data guard rules that correspond to the data guard configuration.

20 Claims, 4 Drawing Sheets

(56) References Cited

U.S. PATENT DOCUMENTS

| | | | |
|---|---|---|---|
| 2007/0291791 A1 | 12/2007 | Enlgish et al. | |
| 2008/0010454 A1* | 1/2008 | Holden | G06F 21/31 |
| | | | 713/166 |
| 2008/0208621 A1* | 8/2008 | Karkanias | G06Q 50/22 |
| | | | 705/2 |
| 2008/0228654 A1* | 9/2008 | Edge | G01S 19/48 |
| | | | 705/71 |
| 2010/0192217 A1 | 7/2010 | Arnold | |
| 2012/0291089 A1 | 11/2012 | Bomgardner et al. | |
| 2015/0100890 A1* | 4/2015 | Kosmiskas | G06F 8/61 |
| | | | 715/744 |
| 2016/0027467 A1* | 1/2016 | Proud | G11B 20/10527 |
| | | | 381/56 |
| 2016/0241597 A1* | 8/2016 | Falk | G06F 21/62 |

\* cited by examiner

CONFIGURABLE CROSS-DOMAIN INFORMATION ASSURANCE

BACKGROUND

In many processing and communication environments, different data domains may be subject to different security requirements and/or required levels of information assurance. For example, a first communication network or information domain may be used to communicate highly secret or confidential information. There may be strict security requirements associated with the processing or communicating the data associated with such a heightened security domain. Examples of domains or networks that may be require robust security conditions may include networks that processes classified, secret, and/or top secret data. In order to protect the sensitive data utilized in such networks, typically the data is isolated and/or prevented from egressing from the secure network unless the sensitive data is encrypted prior to network egress. For some sensitive data, egress from the secure network may not be allowed at all.

Other networks, such as the Internet, may not be subject to such heightened security requirements. Often these networks may be used to communicate data between other networks with heightened security requirements. In order to communicate secure data across such an unsecure network, the data is often encrypted prior to entering the unsecure network and decrypted by an authorized user upon receipt in target secure network. Such encryption techniques can prevent the unauthorized access of secure data during transmission over an unsecure network.

Data within a secure network may be of varying levels importance and thus may be subject to different security requirements. For example, some data within a secure network may be highly sensitive and subject to requirements that this highly sensitive data not be permitted outside of the secure network. Other data within the secure network may be less sensitive, and disclosure of the data outside the secure network may be permitted. In order to allow some data to pass outside the secure network into a relatively less secure network, cross-domain solutions (CDSs) are used as a mechanism to access or transfer information between two or more differing security domains.

CDSs may be software and/or hardware based modules that are configured to process or filters data exiting or entering a given domain or system at a network or radio interface. For example, CDSs may be configured to inspect and/or modify the data passing from one domain to another in order to enforce security rules regarding what data can or cannot be allowed to pass to or from the network or radio interface. The majority of CDSs today are implemented in software within a trusted operating system running on a general purpose processor such as the Intel x86 or the PowerPC. However, existing CDSs often suffer from being unable to achieve throughputs greater than 10 Gigabits per second (Gb/sec) and likely will have difficulty scaling to upcoming 100 Gb/sec data rates. Additionally, existing CDSs have latencies typically on the order of milliseconds, while upcoming real-time applications are expected to have latency on the order of 10 s of microseconds ($\mu s$).

SUMMARY

Methods for configuring and utilizing a configurable data guard (CDG) implemented on a hardware-based programmable logic device are disclosed. For example, the CDG may include a first network interface configured to receive data to be processed by the CDG. The data may be received from a first network associated with a first security domain. The CDG may include a first integrated circuit portion comprising a plurality of arrays of generic comparison operations. The CDG may include a second integrated circuit portion comprising a plurality of arrays of generic action operations. The CDG may include a microprocessor configured to receive a data guard configuration, for example from a computer used to configure the CDG. The microprocessor may perform an authentication and integrity check procedure on the received data guard configuration. The microprocessor may configure a plurality of guard primitives based on the data guard configuration. For example, each guard primitive may be configured from at least one generic comparison operation from the first integrated circuit portion and at least one generic action operation from the second integrated circuit portion. The guard primitives may be used to enforce the complex data guard rules that correspond to the data guard configuration. The CDG may include a second network interface configured to output the data after the data has been processed by the plurality of guard primitives. The data may be sent to a second network associated with a second security domain.

The CDG may be configured to operate on user plane data while not affecting the control plane data associated with communications to be processed. For example, microprocessor may be configured to normalize the data received via the first network adapter prior to the data being processed by the plurality of guard primitives. Normalizing the data may include removing transport layer control plane data and removing application layer control plane data from the communications to be processed. The microprocessor may be further configured to re-frame the data after the data has been processed by the plurality of guard primitives. Re-framing the data may result in the control plane data being re-attached to the processed user plane data, for example, by re-attaching the application layer control plane data and re-attaching the transport layer control plane data.

The hardware-based programmable logic device used to implement the CDG may include an application specific integrated circuit (ASIC) and/or a field programmable gate array (FPGA). The arrays of generic comparison operations and arrays of generic action operations may be hard coded into the programmable logic device before delivery to the end user. The end user may then load a specific data guard configuration into the CDG in order to specify how to connect generic comparisons and generic actions in order to form guard primitives that enforce more complex data guard filter rules specified by the end user. The microprocessor may be configured to perform a check of the plurality of generic comparison operations and each of the plurality of generic actions operations at start-up. The microprocessor may be configured to perform a known answer test for each of the plurality of guard primitives when configuring the plurality of guard primitives.

A method for configuring a configurable data guard (CDG) is disclosed. For example, the CDG may receive a data guard configuration from a computing device. The data guard configuration may correspond to a configuration table that specifies how to implement relatively complex filtering rules via a plurality of generic comparison operations and a plurality of generic action operations. The CDG may perform an authentication and integrity check procedure on the received data guard configuration. The CDG may configure a plurality of guard primitives based on the data guard configuration. For example, each guard primitive may be configured from at least one generic comparison operation corresponding to a first integrated circuit portion of the CDG and at least one generic action operation corresponding to a second integrated circuit portion of the CDG.

The data guard configuration may include an input/output (I/O) configuration. The I/O configuration may indicate which application layer protocol(s) are utilized by communications to be processed by the CDG and/or which transport layer protocol(s) are utilized by communications to be processed by the CDG. The CDG may configure a communication protocol normalization adapter to remove control plane data associated with the communications processed by the CDG prior to processing the communications via the plurality of guard primitives. The CDG may configure a communication protocol framing adapter to re-attach the control plane data associated with the communications processed by the CDG after to processing the communications via the plurality of guard primitives.

For example, after applying the end-user defined guard configuration, the CDG may receive a first communication at the first network interface. The communication protocol normalization adapter may remove control plane data from the first communication prior to the first communication being processed via the plurality of guard primitives. The CDG may process the user data plane data of the communication via the plurality of guard primitives after applying the data guard configuration. The communication protocol framing adapter may re-apply the control plane data to the first communication after the first communication has been processed via the plurality of guard primitives. The CDG may output the first communication via a second network interface.

DETAILED DESCRIPTION

Figure 1:
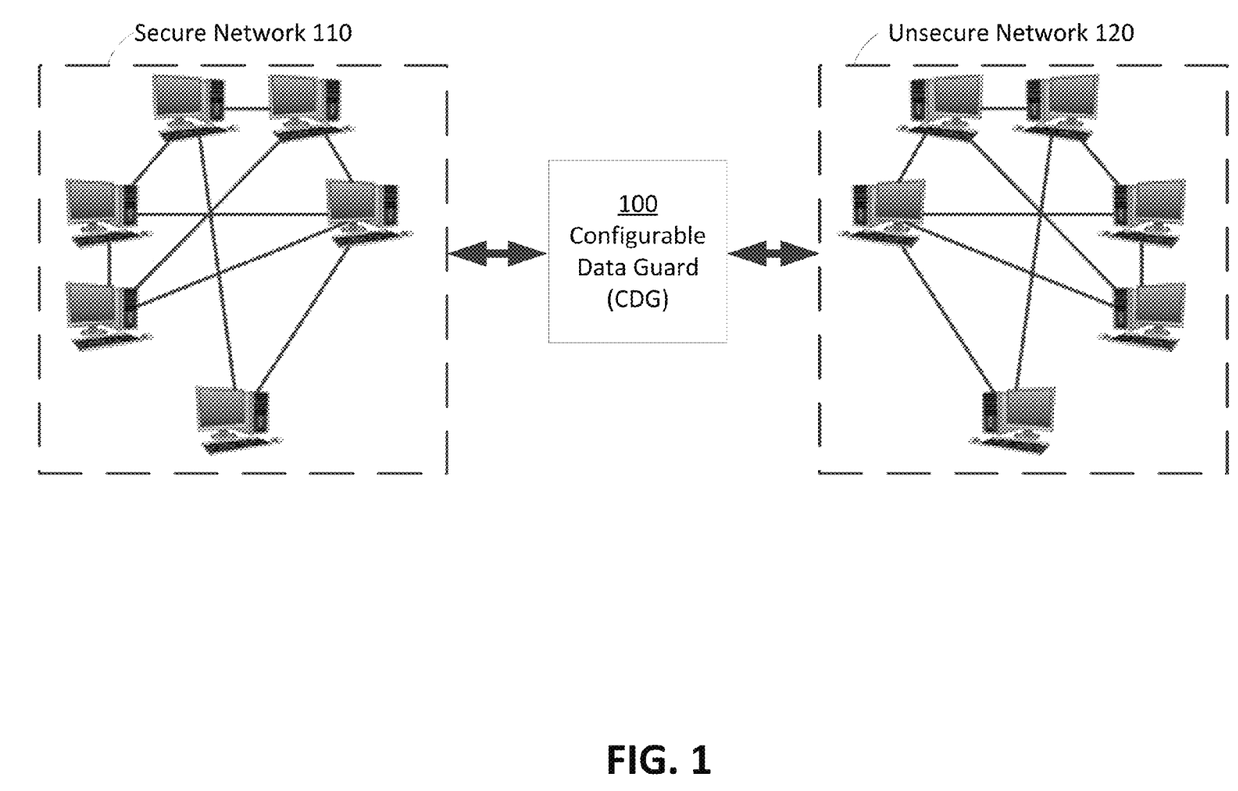
FIG. 1 illustrates an example cross-domain environment in which an example CDG may be implemented.

FIG. 1 illustrates an example cross-domain environment in which a Configurable Data Guard (CDG) may be implemented. For example, Secure Network 110 may be a network for which a heightened level of assurance or security may be utilized. For example, highly sensitive or confidential information may be communicated within Secure Network 110. Examples of secure data may include confidential data, classified data, secret data, top secret data, and/or any other data for which additional levels of security or protection are desired. Other, less sensitive data may also be communicated within Secure Network 110. However, this level of relatively less sensitive data is often treated or processed as if it is highly sensitive data within Secure Network 110. The relatively less secure data may be permitted to egress Secure Network 110, provided the less secure data can be separated from or otherwise divorced from the secure data within the network. For purposes of data assurance and security, it may be assumed that unauthorized users or devices are unable to access data within Secure Network 110.

Unsecure Network 120 may be a network with a relatively less robust security mechanisms than Secure Network 110. For example, Unsecure Network 120 may include the Internet or other public networks. For purposes of data assurance and security, it may be assumed that unauthorized users or devices are able to access data within Unsecure Network 120. Thus, the sensitive data within Secure Network 110 may not be permitted in Unsecure Network 120 and/or may be permitted only when in an encrypted or otherwise protected form.

Although examples herein may be described in terms of secure and unsecure networks, the techniques and methods described herein may be applicable more generally to divisions of networks or domains for various purposes. For example, although the examples for Secure Network 110 and Unsecure Network 120 may be described with respect to divisions or separations for purposes of data security, the separation of data may also be for other purposes. For example, the networks may be separated for purposes of confidentially, data integrity, data isolation, and/or the like. Further, although examples may be described in terms of "secure" vs. "unsecure" networks, both the secure and unsecure networks may be subject to security requirements, although the security requirements for the different networks may be of a different nature or degree. Additionally, Secure Network 110 and Unsecure Network 120 may be comprised of one or more devices, for example a single computing device. The communication protocols between the networks may be wired and/or wireless communication protocols.

Configurable Data Guard (CDG) 100 may be configured as an interface between Secure Network 110 and Unsecure Network 120. For example, CDG 100 may be configured to communicate data to and/or from Secure Network 110. CDG 100 may be configured to communicate data to and/or from Unsecure Network 120. CDG 100 may be configured to access or transfer data between Secure Network 110 and Unsecure Network 120. CDG 100 may be configured to allow one-way traffic between Secure Network 110 and Unsecure Network 120 or may be configured to allow two-way traffic between Secure Network 110 and Unsecure Network 120.

CDG 100 may be configured to filter or otherwise process data passing between Secure Network 110 and Unsecure Network 120. For example, CDG 100 may be configured to enforce rules regarding what data is allowed to pass between Secure Network 110 and Unsecure Network 120. Examples of types of filtering that may be performed by CDG 100 may include one or more of enforcing data confidentiality (e.g., by blocking or filtering data deemed confidential), ensuring data integrity (e.g., performing content management functions such as filtering for viruses and malware; executing content examination utilities; managing high-to-low security transfers), enforcing access rules (e.g., permitting access to authorized users and denying access to unauthorized users), an/or the like. In this manner, CDG 100 can be configured to permit certain information or data to pass between Secure Network 110 and Unsecure Network 120 while blocking and/or modifying other data between exchanged between Secure Network 110 and Unsecure Network 120.

CDG 100 may be implemented using a hardware-based programmable logic device (PLD) that is configured to perform one or more filtering functions. For example, CDG 100 may be implemented using field programmable gate array (FPGA) that is configured to perform one or more filtering functions. Other examples of PLDs that may be used to implement CDG 100 may include application-specific integrated circuits (ASICs), application-specific standard parts (ASSPs), complex programmable logic devices (CPLDs), and/or other PLDs that include reprogrammable hardware and/or reprogrammable integrated circuits. The PLD used to implement CDG 100 may be programmed or configured to enforce the filtering rules using a hardware descriptor language (HDL) such as Very High Speed Integrated Circuit (VHSIC) Hardware Description Language (VHDL) or Verilog. Rather than or in addition to being programmed via an HDL, CDG 100 may be configured via a circuit design to implement a similar configuration.

By implementing CDG 100 in a programmable logic device, data rates for transfer between Secure Network 110 and Unsecure Network 120 via CDG 100 may be on the order of hundreds (or thousands) of Gb/sec and latency due to processing by CDG 100 may be on the order of microseconds. However, if the filtering rules being enforced by CDG 100 are complex, there is an increased likelihood that there are latent errors present in the implementation due occurrence of programming errors in the HDL code used to configure the device. Additionally, if the final filtering rules to be enforced by CDG 100 are directly configured to the device using HDL code, modification of the filtering rules would result in re-compilation of the VHDL code for the device. For applications where certification or validation of CDG 100 prior to fielding is desired or required (e.g., which is often the case for classified or other high-security systems), re-compiling the HDL code to reconfigure the device may require additional testing or certification. Further, if the change in filtering rules is to be performed by the end user deploying one or more of Secure Network 110 and/or Unsecure Network 120, the developer of CDS 100 may need to be involved in the re-programming of the device, which can increase maintenance and operating costs.

To facilitate a more efficient, robust, and cost-effective approach for adding, deleting, and/or modifying the filtering rules applied by CDG 100, CDG 100 may be implemented using a programmable logic device is configured to support generic filtering rules that can be programmed/re-programmed to implement more complex filtering rules. For example, HDL code may be used to develop a set of generic filtering rules. The HDL code may also define a mechanism by which CDG 100 may accept a data file or other configuration that defines how the generic filtering rules may be applied in order to implement more complex filtering rules to be applied between Secure Network 110 and Unsecure Network 120. In this manner, a fielded CDS may be reprogrammed by using the configuration file to redefine how to apply the generic filtering rules in order to implement new specific/complex filtering rules that are defined to meet application goals.

For example, generic filtering rules may be coded in HDL to the PLD such that arrays of generic filters are present in the hardware-defined PLD. The HDL may also be coded to include an interface module for accepting a more complex filtering rules that are defined in a configuration file. The configuration file may dictate how the generic arrays are to be applied in order to achieve the more complex filtering rule. In this manner, the generic rules defined by the HDL may be considered building blocks that are used to implement the more complex filtering rules defined in the configuration file.

Such an approach of using relatively simple, generic filters to build more complex rules allows for the CDG to be more efficiently (re)programmed upon deployment. For example, the generic filter arrays may be robust coded in HDL and verified prior to delivery to the end user to ensure there are no latent defects in the programmable logic. The CDG may be programmed via HDL to include a built-in self-test to ensure that the generic rules are operating correctly irrespective of the specific, complex rules defined in the configuration. In this manner, the data throughput and latency gains that are achievable via a hardware based implementation may be realized while having a reprogrammable flexibility similar to a software based implementation.

The generic rules defined by the HDL and implemented via the generic arrays within the CDG may include generic comparisons and generic actions. A combination of one or more generic comparison and one or more generic actions may be referred to as a guard primitive. The one or more generic actions of the guard primitive may be defined to be conditional on the results of the one or more generic comparisons. Table 1, below, identifies examples of generic comparisons that may be programmed into the CDG using the HDL code. The examples identified in Table 1 are exemplary comparisons and different and/or additional comparisons other than those identified in Table 1 may be utilized.

TABLE 1

Examples of Generic Comparisons That May Be Implemented by the CDG

| Generic Comparison | Description |
|---|---|
| "Equal to" (=?) | Determines if an inspected element is equal to or equivalent to a specified value(s) |
| "Not equal to" (!=?) | Determines if an inspected element is not equal to or not equivalent to a specified value(s) |
| "Greater than" (>?) | Determines if an inspected element is greater than a specified value(s) |
| "Greater than or equal to" (>=?) | Determines if an inspected element is greater than or equal to a specified value(s) |
| "Less than" (<?) | Determines if an inspected element is less than a specified value(s) |
| "Less than or equal to" (<=?) | Determines if an inspected element is less than or equal to a specified value(s) |
| "Within the set of" (∈?) | Determines if an inspected element is within a set of specified value(s) |
| "Outside the set of" (∉?) | Determines if an inspected element is not within a set of specified value(s) |
| "Within the range" | Determines if an inspected element is between two specified values |
| "Outside the range" | Determines if an inspected element is not between two specified values |

The generic comparisons, such as the generic comparisons identified in Table 1, may be used by the CDG in order to inspect elements of messages or transmissions being processed by the CDS. For example, the CDG may be configured to inspect a packet passing from a first domain (e.g., a first network) to a second domain (e.g., a second network). The CDG may be configured to utilize one or more of the generic comparisons in order to inspect a portion of the packet and/or a specific field of the packet. For example, the CDG may be configured to determine whether a specific control field, such as an Internet Protocol (IP) address, is equal to a certain value. In another example, rather than or in addition to inspecting a control field of the packet, the CDG may inspect a data field or a subset of the data field of the IP packet. For example, the CDG may be configured to expect the data field of the packet to have a predefined or predetermined format. The CDG may inspect a portion of the predefined data format to apply the generic comparison. As an example, the data field may include a portion that corresponds to a geographical coordinates, and the CDG may be configured to determine if the received geographical coordinates are within a predetermined range of geographical coordinates. When the arrays of generic comparisons are pre-configured on the CDG, a first integrated circuit portion of the programmable logic device that implements the generic comparisons in hardware may be loaded onto CDG.

The CDG may be configured to take certain actions based on the results of one or more generic comparisons. For example, as noted above, the guard primitives may include one or more generic actions that may performed based on the results of the one or more generic comparisons. Table 2, below, identifies example below, identifies examples of generic actions that may be programmed into the CDG, for example using the HDL code. The examples identified in Table 2 are exemplary actions and different and/or additional actions other than those identified in Table 2 may be utilized.

As an example, suppose the CDG is to be used to enforce a rule that ensures that packets being sent outside a predetermined range of IP addresses should have a certain field within the data payload portion of the message be blocked or otherwise redacted. The rule may be defined or constructed using one or more guard primitives that are each comprised of a combination of one or more generic comparisons and one or more generic actions. The generic comparisons and actions may be pre-configured in the CDG, and a configuration file that specifies the more complex rule (e.g., that field should be masked if IP address is outside the appropriate range) may be utilized or loaded to the CDG in order to specify a set of one or more guard primitives (e.g.,

TABLE 2

Examples of Generic Actions That May Be Implemented by the CDG

| Generic Action | Description |
|---|---|
| "Pass Field" | The field/bits being inspected may be passed in an unmodified form |
| "Block Field" | The field/bits being inspected may be masked, zeroed, or deleted |
| "Fill with Zero" | The field/bits being inspected may be set to zero |
| "Fill with One" | The field/bits being inspected may be set to one |
| "Modify Field" | The field/bits being inspected may be modified or changed to a dynamically determined or predefined value |
| "Pass Message" | The entire message may be passed or allowed |
| "Discard Message" | The entire message may be blocked or discarded |
| "Modify Message" | All or a portion of the message may be changed or modified |
| "Evaluate Additional Field" | An additional or different field/bits may be conditionally subject to a subsequent inspection or filtration |
| "End Evaluation" | The inspection or filtration of the message may be stopped or ended |
| "Encrypt" | The entire message, a portion of the message, and/or specific field(s)/bit(s) may be encrypted |
| "Decrypt" | The entire message, a portion of the message, and/or specific field(s)/bit(s) may be decrypted |
| "Copy" | The field/bits being inspected may be copied/stored |
| "Replace" | The field/bits being inspected may be replaced with a specified or dynamically determined value |
| "Log" | A log entry may be modified or added |
| "Increment Count" | A counter may be incremented |
| "Decrement Count" | A counter may be decremented |
| "Encapsulate" | One or more fields may be encapsulated into the message or a field of the message |
| "De-encapsulate" | One or more fields may be de-encapsulated from message or a field of the message (e.g., for further inspection) |
| "Parse" | A message of field may be inspected for a certain value or bit sequence |
| "Re-route" | The message destination may be changed or modified |
| No action | No action may be taken for certain generic comparison results |

The generic actions, such as the generic actions identified in Table 2, may be used by the CDG in order to appropriately process a message and/or field within the message or transmission being processed by the CDG. The actions may be performed in response to one or more generic comparisons. The HDL code used to configure to the CDG prior to deployment may define arrays of generic actions that may be appropriately configured to the linked to specific generic comparisons in order to implement more complex routing rules or filters. The combination of one or more generic comparisons and generic comparisons may be referred to as a guard primitive. Thus, in this manner the CDG can be initially configured using HDL to define arrays of generic comparisons and arrays of generic actions which can be later configured via a configuration file or configuration data to implement more complex routing and filtration rules by specifying corresponding guard primitives. When the arrays of generic actions are pre-configured on the CDG, a second integrated circuit portion of the programmable logic device that implements the generic actions in hardware may be loaded onto CDG.

combination of one or more generic comparisons and one or more generic actions) that may be used to implement the complex rule.

In this example, a configuration file may specify or indicate that a first guard primitive should be defined that inspects the IP address portion of the message. For example, the first guard primitive may be defined by a generic comparison that determines whether the IP address in the message is outside a range of IP address specified in the configuration. The first guard primitive may also include a first action that de-encapsulates a data portion of the message being inspected if the generic comparison indicates that the IP address is outside the range of IP addresses defined in the configuration. The first guard primitive may also include a second action that passes the message being inspected without modification if the generic comparison indicates that the IP address is not outside the range of IP addresses defined in the configuration.

The configuration may also indicate that additional filter rules should be defined using guard primitives in order to modify the message when the IP address is outside the range of configured IP addresses. As an example, the additional rule may be implement using a second guard primitive, although as may be appreciated the rule may be implemented using a variety of one or more guard primitives. For example, the second guard primitive may be used identify the appropriate field to be masked and mask the field once found. As an example, the second guard primitive may correspond to identifying a field identifier or flag that indicates which portion of the de-encapsulated data portion of the message corresponds to the field of interest. Such a determination may be implemented, for example, by utilizing a second guard primitive that corresponds to determining whether a portion of the de-encapsulated data portion is equal to the bit values '10101010' which in this example may be the bit flag that corresponds to an indication that the next portion of the message is the field of interest. The second guard primitive may be defined to take no action when the bit values being inspected do not equal '10101010' and to block the next field/set number of bits when the inspected bit values do equal the '10101010' value. Thus, in this example the generic comparison of the second guard primitive may include determining whether the inspected field is equal to '10101010' and the generic actions of the second guard primitive may include no action when the inspected field is not equal to '10101010' and block the next field when the inspected field is equal to '10101010'. As may be appreciated, using this combination of a generic comparison and two generic actions is used for purposes of explanation, and many different combinations of generic comparisons and generic actions may be used to achieve the same result (e.g., the second primitive could include actions such as counting a specified number of bits in the de-encapsulated field until the field of interest is reached).

In an example, the CDG may be configured to apply filtering rules to data portions of messages/transmissions but may refrain from applying the filtering to control portions of the message/transmission. For example, the control data associated with the message (e.g., headers, sub-headers, flags, other transmission attributes, etc.) may pass through the CDG unchanged, while the data portion (e.g., payload, data field, etc.) may be inspected and subject to the complex filtering rules as defined by the configuration. For example, the CDG may utilize one or more guard primitives to inspect the user data/data plane portion of messages to ensure unauthorized data is not passed to a security domain that is inconsistent with the security requirements of the user plane data.

By pre-configuring the CDG with arrays of generic comparisons and arrays of generic actions, the CDG may be configured/re-configured later with specific, complex inspection rules that are defined based on an application-specific configuration file that is loaded by the end user. In this manner, a hardware-based programmable logic device may be used to implement the CDG—which may be capable of performing the complex rules when operating with relatively high data rates with relatively low latency (e.g., as compared to a device that implements the complex rules using a software defined rules and a general purpose processor)—while also allowing for the reconfiguration of the CDG without having to define rules using HDL code. As such, the CDG may be flexible and re-programmable like a software-based implementation while also enjoying the robustness and speed of a hardware-based implementation (e.g., using an FPGA, ASIC, etc.).

In order to apply the more complex rules that may be applicable to a wide variety of applications using the guard primitives comprised of generic comparisons and generic actions, the CDG may be configured with an input/output (I/O) configuration that normalizes the data being processed prior to the application of the guard primitives. By normalizing the data prior to operation using the guard primitives, fewer distinct generic comparisons and generic actions may need to be pre-defined within the CDG via HDL code and/or less complex combinations of guard primitives may be used while still allowing the CDG to perform a large variety of filtering tasks. A portion or all of the I/O configuration and normalization rules may be predefined in the CDG via the HDL code. In an example, some aspects of the I/O configuration may be modified based on the application specific configuration that defines the more complex filtering rules.

Figure 2:
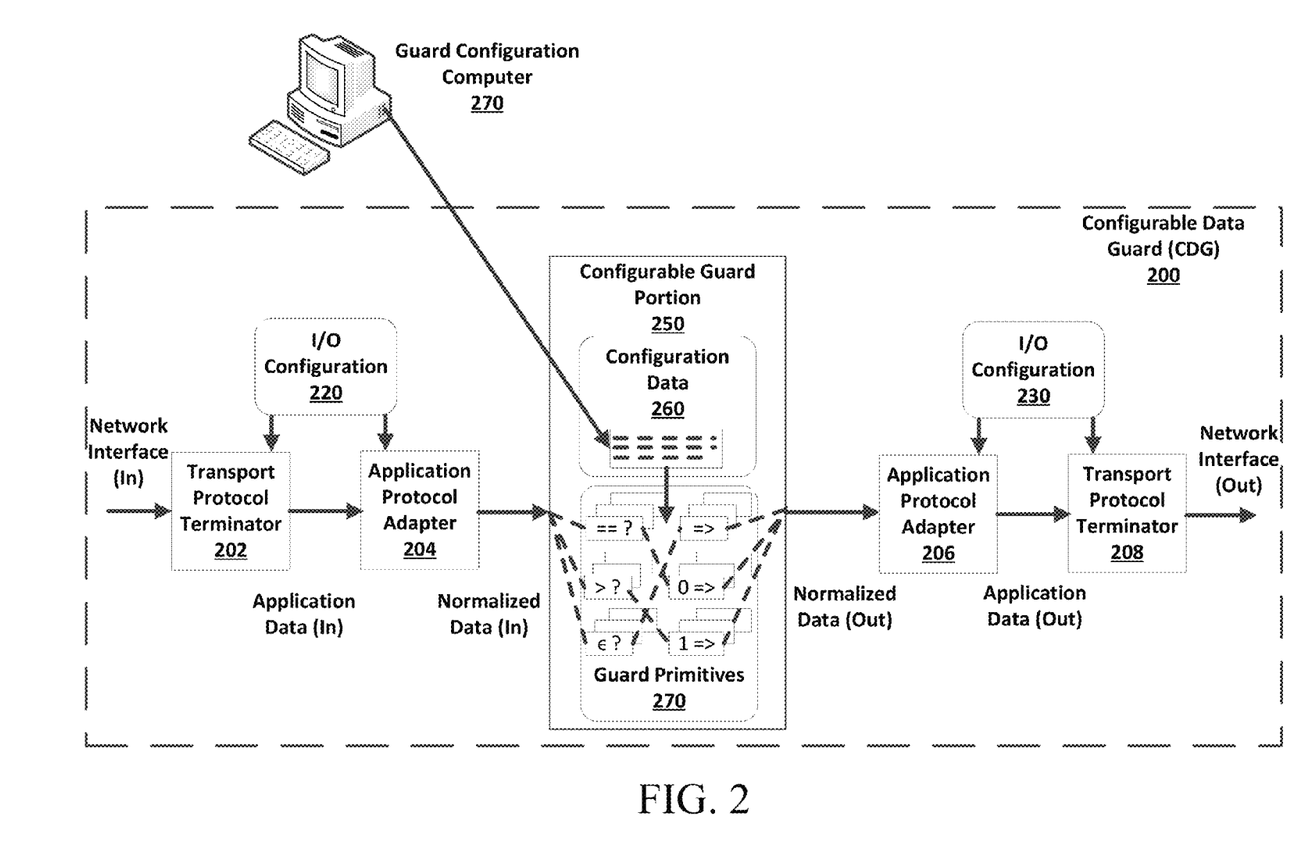
FIG. 2 illustrates an example functional architecture for implementing a CDG.

FIG. 2 illustrates an example architecture for implementing a CDG with I/O configurations. For example, the CDG may be configured to interface between two data/security domains and/or different networks. Each of the networks/domains may utilize the same underlying communication protocols or may utilize different communication protocols. For example, Configurable Data Guard (CDG) 200 shown in FIG. 2 may include a first network interface (e.g., Network Interface (In)) that is configured to receive data from a first network, a first device, a first security domain, etc. As may be appreciated CDG 200 may facilitate one-way and/or two-way communications, and the network interfaces may be operably configured for transmission and/or reception operation depending on the application. Similarly, CDG 200 may include a second network interface (e.g., Network Interface (Out)) that is configured to transmit data to a second network, a second device, a second security domain, etc.

The network interfaces of CDG 200 may be configured to support communications across a wide variety of communication protocols. For example, the network interface may be a point of network interconnection between CDG 200 and one or more of a computer, a private network, a public network, a local area network, a wide area network, a radio transceiver, a point-to-point link, and/or the like. The network interface may support communications using a wired connection (e.g., Ethernet or other twisted pair communications, coaxial cable, optical fiber, etc.) and/or a wireless connection (e.g., Wi-Fi, radio frequency (RF) and other spread spectrum communications, microwave communications, cellular communications, satellite communications, free space optical communications, etc.). CDG 200 may be co-located with or otherwise form a portion or module of a network interface controller, an encryption/decryption device, a communication repeater, a communication hub, a network bridge, a network switch, a router, a modem, a firewall, and/or the like. CDG 200 may be configured to operate according to one or more network topologies such as a bus network, a star network, a ring network, a mesh network, a fully connected network, a tree network, and/or the like.

In order to support data guard functionality across various types of communication protocols and network architectures, the CDG 200 module is configured to interface with each of the networks to which the CDG 200 is connected and normalize the data prior to processing a Configurable Guard Portion 250. For example, if the data to be processed by Configurable Guard Portion 250 is received a Network Interface (IN), Transport Protocol Terminator 202 and/or Application Protocol Adapter 204 may be configured to receive the data to be processed and normalize the data for processing prior to operations on the data by Configurable Data Guard 250. Input/Output (I/O) Configuration 220 may dictate the manner in which Transport Protocol Terminator 202 and/or Application Protocol Adapter 204 process the input data based on the application or environment in which CDG 200 is being deployed.

For example, Transport Protocol Terminator 202 may be configured to terminate the lower level protocols (e.g., link layer protocol) that are used to carry user messages. For example, for serial communications Transport Protocol Terminator 202 may be used as a termination point for a point-to-point protocol (PPP) that is used for transporting datagrams over a point-to-point link. Other examples of serial communication protocols that could be terminated in Transport Protocol Terminator 202 may include Serial Line Internet Protocol (SLIP), Synchronous Data Link Protocol (SDLC), High-level Data Link Control (HDLC), Link Access Procedure (LAP), Logical Link Control (LLC), and/or the like. CDG 200 may support communication protocols that utilize non-serial communications such as a shared media link over which multiple device can communicate. Examples of protocols terminated at Transport Protocol Terminator 202 may include one or more of Ethernet or other Medium Access Control (MAC) protocols, IP, User Datagram Protocol (UDP), Transmission Control Protocol (TCP), Stream Control Transmission Protocol (SCTP), Datagram Congestion Control Protocol (DCCP), Resource Reservation Protocol (RSVP), and/or the like. Generally, Transport Protocol Terminator 202 may be configured to de-encapsulate application layer datagrams from lower layer protocols such as the link layer, internet layer, and/or transport layer transmission protocols. I/O Configuration 220 may specify which combination of link layer, internet layer, and/or transport layer protocols are utilized for a given application.

The payload extracted by Transport Protocol Terminator 202 may be any application layer protocol such as Institute of Electrical and Electronics Engineers (IEEE) 1278.1 Distributed Interactive Simulation (DIS), Extensible Markup Language (XML) or other markup languages, Hypertext Transfer Protocol (HTTP), Real-time Transport Protocol (RTP), File Transfer Protocol (FTP), Internet Message Access Protocol (IMAP), Simple Mail Transfer Protocol (SMTP), Transport Layer Security (TLS), and/or the like. In order to further extract and normalize the data prior to processing by Configurable Guard Portion 250, Application Protocol Adapter 204 may be configured to parse the application layer data output from Transport Protocol Terminator 202 in order to extract the actual user data being communicated. For example, Application Protocol Adapter 204 may be configured to parse the application protocol (e.g., such as DIS, HTTP, FTP, etc.) in order to generate a normalized internal representation of the data that can be evaluated by Configurable Guard Portion 250. I/O Configuration 220 may be used to configure Application Protocol Adapter 204 based on the type of application protocol being used in a given deployment. Together Transport Protocol Termination 202 and Application Adapter 204 may be configured to extract normalized user payload data from data received from a network interface that uses any variety of link layer and/or application layer protocols. Transport Protocol Termination 202 and Application Adapter 204 may be referred to as a Communication Protocol Normalization Adapter.

Once the data to be processed has been normalized to remove communication protocol control-plane data, the normalized user-plane data can be processed by Configurable Guard Portion 250. Configurable Guard Portion 250 may include a plurality of arrays of Guard Primitives 270. Each of Guard Primitives 270 may include on or more generic comparisons and one or more generic actions. Example generic comparisons illustrated by Guard Primitives 270 include "Equal to", "greater than", and "Within the set of". Example generic actions illustrated by Guard Primitives 270 include "Copy", "Fill with Zeros", and "Fill with Ones". Since the data being processed was normalized prior to being operated on by Configurable Guard Portion 250, the operations associated with Guard Primitives 270 may be implemented independent of the application protocol (e.g., DIS) used to transport the data. Rather Guard Primitives 270 may be generic operations implemented to operate on CDG 200's internal, normalized data types.

In order to enforce filtering rules that are application specific and more complex than the generic Guard Primitives 270, the sequence of checks and the response operations used to define the complex filtering rules using Guard Primitives 270 are configured by a user-defined guard configuration data table, represented by Configuration Data 260 in FIG. 2. This Configuration Data 260 is used to specify the manner in which Guard Primitives 270 are to be applied to the normalized data input to Configurable Guard Portion 250. For example, Configuration Data 260 may define the manner in which the various Guard Primitives 270 should be defined in order to operate on the normalized data. Configuration Data 260 may specify which normalized user plane data is to be used as an input to a generic comparison. Configuration Data 260 may specify which generic action should be used based on the result of a generic comparison (e.g., to define a given Guard Primitive 270). Configuration Data 260 may define whether the result of a Guard Primitive 270 (e.g., the data resultant from a generic action performed in result to a specified generic comparison) should be output from Configurable Guard Portion 250 or fed back into a subsequent (e.g., different) guard primitive for subsequent processing. As may be appreciated, depending on the complexity of the filter rules being specified by Configuration Data 260, a single guard primitive may be used for some filter rules or a set of multiple (e.g., recursive) guard primitives may be utilized.

Configuration Data 260 may be loaded to CDG 200 via Guard Configuration Computer 270. Guard Configuration Computer 270 may be any computing device capable of providing CDG 200 with Configuration Data 260. CDG 200 may include certain configuration pins that may be used to interface with Guard Configuration Computer 270 in order to receive Configuration Data 260. Guard Configuration Computer 270 may include a general purpose processor that utilizes computer readable instructions that is configured to generate a configuration data table that can be updated and maintained by the end user of CDG 200 in order to define Configurable Guard Portion 250 with application specific guard rules. For example, end-user administrators may utilize a graphical user interface presented on Guard Configuration Computer 270 in order to define the guard functions to be implemented via Configurable Guard Portion 250. Guard Configuration Computer 270 may send the configuration table as signed (e.g., authenticated) data block to be interpreted by Configurable Guard Portion 250. Various types of communications interfaces, such as Universal Serial Bus (USB), Firewire, RS-232, and/or the like may be used to interface Guard Configuration Computer 270 with CDG 200 in order to receive Configuration Data 260. Configuration Data 260 may be loaded via serial and/or packetized communications over a communication bus or channel and/or may be loaded via a removable media such as a USB flash drive, CD/DVD disk, etc.

Configuration Data 260 may define how Configuration Guard Portion 250 implements one or more of the configuration between the normalized input data and the generic comparisons of Guard Primitives 270, the configuration of Guard Primitives 270 (e.g., the manner in which generic actions are connected/linked to generic actions, how different guard primitives are linked to each other etc.), and/or the configurations between the generic actions of Guard Primitives 270 and the normalized output data. Configuration data 260 may define how Configurable Guard Portion 250 is tested in order to ensure Guard Primitives 270 are correctly configured in order to perform a desired function.

For example, Configuration Data 260 may include known-answer test data that is used by CDG 200 to test a specific implementation of Configurable Guard Portion 250. The known-answer test data may include sample normalized input data (e.g., and/or non-normalized data as if from the network interface prior to application of Transport Protocol Terminator 202 and/or Application Protocol Adapter 204) to be processed by Configurable Guard Portion 250. Upon applying the a configuration of Guard Primitives 270 as defined by Configuration Data 260, the sample input data may be processed by Configurable Guard Portion 250. Configuration Data 260 may include an expected output from Configurable Guard Portion 250 (e.g., and/or the expected output may be considered after de-normalization by Application Protocol Adapter 206 and/or Transport Protocol Terminator 208) and may compare the output determined based on the operations performed by Guard Primitives 270 to the expected output. The output generated on the sample input data may be sent to Guard Configuration Computer 270 for comparison to an expected output. If the output determined based on the sample input data matches the expected output, then Configurable Guard Portion 250 can be considered to be correctly configured. If the output determined based on the sample input data does not match the expected output, then Configurable Guard Portion 250 may be reconfigured and/or new Configuration Data 260 may be applied to Configurable Guard Portion 250.

In an example, CDG 200 may be configured to apply a self-test of the generic comparisons and generic actions of Guard Primitives 270 upon start-up. Rather than or in addition to checking a configuration for Guard Primitives 270 that is defined based on Configuration Data 260, such a test of the individual arrays of generic comparisons and generic actions may be used to ensure the each of the building blocks of Guard Primitives 270 is operating correctly prior to applying the configuration to Configurable Guard Portion 250. For example, a common test specific to a given generic comparison and/or a given generic action may be applied to each copy of that primitive portion in order to ensure that each of the generic actions/comparisons is operating according to the desired functionality of that primitive. Such an autonomous self-test of the comparisons and actions may be used to ensure irrespective of which specific primitives are subsequently enabled by the user configuration data, the primitives will operate according to their known HDL-based configuration and can be used to identify hardware based latent errors in the coding and/or implementation of the underlying building blocks for the guard primitives. In an example, all of the individual generic comparisons and individual generic action included in the primitive arrays defined via HDL can be tested to ensure proper operation prior to loading of a specific configuration into the configurable guard portion. Such a 100% test coverage at startup may provide an independent verification to detect latent errors in implementation. Such a test of the building blocks for the configurable guard portion may be used in addition end-to-end self-tests that are included in/defined by Configuration Data 260 that may be used to verify that the as-configured guard has been configured as the administrator intended for a specific application.

After data has been operated on by Configurable Guard Portion 250, the data may be in a normalized form. In order to de-normalize the output data, reverse operations of those performed by Transport Protocol Terminator 202 and/or Application Protocol Adapter 204 may be performed. For example, Application Protocol 206 may be configured to un-parse the normalized output data in order to add application layer metadata to the output user data that has been processed via Configurable Guard Portion 250. For example, Application Protocol Adapter 206 may be configured to frame or otherwise un-parse the data output from Configurable Guard Portion 250 based on the application protocol (e.g., such as DIS, XML, HTTP, FTP, etc.) used to transfer the user data. For example, I/O Configuration 230 may define how the output normalized data is to be structured in order to add application-layer specific control information such as headers, flags, etc. so that the user application receiving the processed data can interpret the data correctly. I/O Configuration 230 may be complementary to I/O Configuration 220 and may be defined to "undo" the control plane processing performed by Application Protocol Adapter 204. Application Protocol Adapter 206 may be in operable communication with Application Protocol Adapter 204 in order to correctly re-frame the output user plane data with the correct application-layer control plane data for transmission. For example, Application Protocol Adapter 206 and Application Protocol Adapter 204 may share common state variables such as counts, sequence numbers, field values, etc. In an example, Application Protocol Adapter 206 and Application Protocol Adapter 204 may be separate functional units that are not in communication and their operation may be defined exclusively based on the respective I/O configurations (e.g., the I/O configurations may be specified in HDL and/or be dependent on the configuration defined by Configuration Data 260).

After the output from Configurable Guard Portion 250 has been re-framed with application specific metadata by Application Protocol Adapter 206, Transport Protocol Terminator 208 may be configured to un-parse/reframe the application data with appropriate transport layer control plane data prior to outputting the processed data on the network interface for transmission. For example, Transport Protocol Terminator 208 may be configured to re-apply control plane data to the application layer data output from Application Protocol Adapter 206 in order re-frame the lower level protocols (e.g., link layer protocol) that are used to carry user messages. For example, for serial communications Transport Protocol Terminator 208 may be configured to act as a termination point for a PPP that is used for transporting datagrams over a point-to-point link and/or may re-apply other transport layer protocols (e.g., SLIP, SDLC, HDLC, LAP, LLC, Ethernet, MAC protocols, IP, UDP, TCP, SCTP, DCCP, RSVP, and/or the like). Transport Protocol Terminator 208 may be configured to encapsulate application layer datagrams into the lower layer protocols such as the link layer, internet layer, and/or transport layer transmission protocols. I/O Configuration 230 may specify which combination of link layer, internet layer, and/or transport layer protocols are utilized for a given implementation. Together Transport Protocol Termination 20 and Application Protocol Adapter 206 may be configured to encapsulate normalized user payload data after processing by Configurable Guard Portion 250 using any variety of link layer and/or application layer protocols. Transport Protocol Termination 208 and Application Adapter 206 may be referred to as a Communication Protocol Framing Adapter.

The CDG may be implemented as a standalone device and/or may be implemented within another device such as a router, a switch, an encryption/decryption device, a transceiver, and/or the like. In an example, the CDG may be implemented on a removable PLD (e.g., ASIC, FPGA, etc.), that can be configured into a module to provide CDG processing, for example on a mezzanine card or other removable assembly. In an example, the CDG device may incorporate a separate processor/microprocessor system that is separate from the configurable guard portion used to implement the implementation-specific filtering rules using the guard primitives. For example, the separate microprocessor may be used to perform the pre-processing and/or post-processing as described for one or more of Transport Protocol Terminator 202, Application Protocol Adapter 204, Application Protocol Adapter 206, and/or Transport Protocol Terminator 208.

In order to ensure that non-authorized users are unable to modify CDG operation, the configuration file may by cryptographically authenticated when the configuration file is being created and/or being loaded by the configuration computer. For example, in order to operate the configuration application on the configuration computer, a user may be required to authenticate the user/configuration by inputting a cryptographic key or password prior to loading the configuration file on the CDG. In addition, the configuration data 260 may itself be cryptographically signed with a cryptographic key, for example in order to allow the CDG to test the configuration validity and authenticate the configuration source. The CDG may be configured via the HDL configuration to accept authenticated configurations but not non-authenticated configurations.

For example, a message authentication code may be used in order to verify both the data integrity of the configuration file and authenticate the source of the configuration file as an authorized user. For example, a cryptographic Hash function (e.g., MD5, SHA-1, etc.) may be used in order to generate a message authentication code based on a secret key known to authenticated users and preconfigured on the CDG prior to loading an end-user specific complex filtering configuration. In an example, the configuration computer may generate a keyed-hash message authentication code (HMAC) based on a predefined secret key and the contents of the configuration file when an authorized user generates a configuration file (e.g., the user may be authenticated by the configuration computer using a username and password, a token, etc.). A copy of the secret key may be stored on the CDG via the HDL code used to generate the generic primitives. Upon generating the configuration file, an authenticated user (e.g., a user who was provided the secret key for the CDG) may generate an HMAC that is specific to the configuration file being loaded using the secret key. The CDG may be configured to authenticate and check the integrity of the file by verifying that the HMAC generated is correct based on its copy of the secret key.

Figure 3:
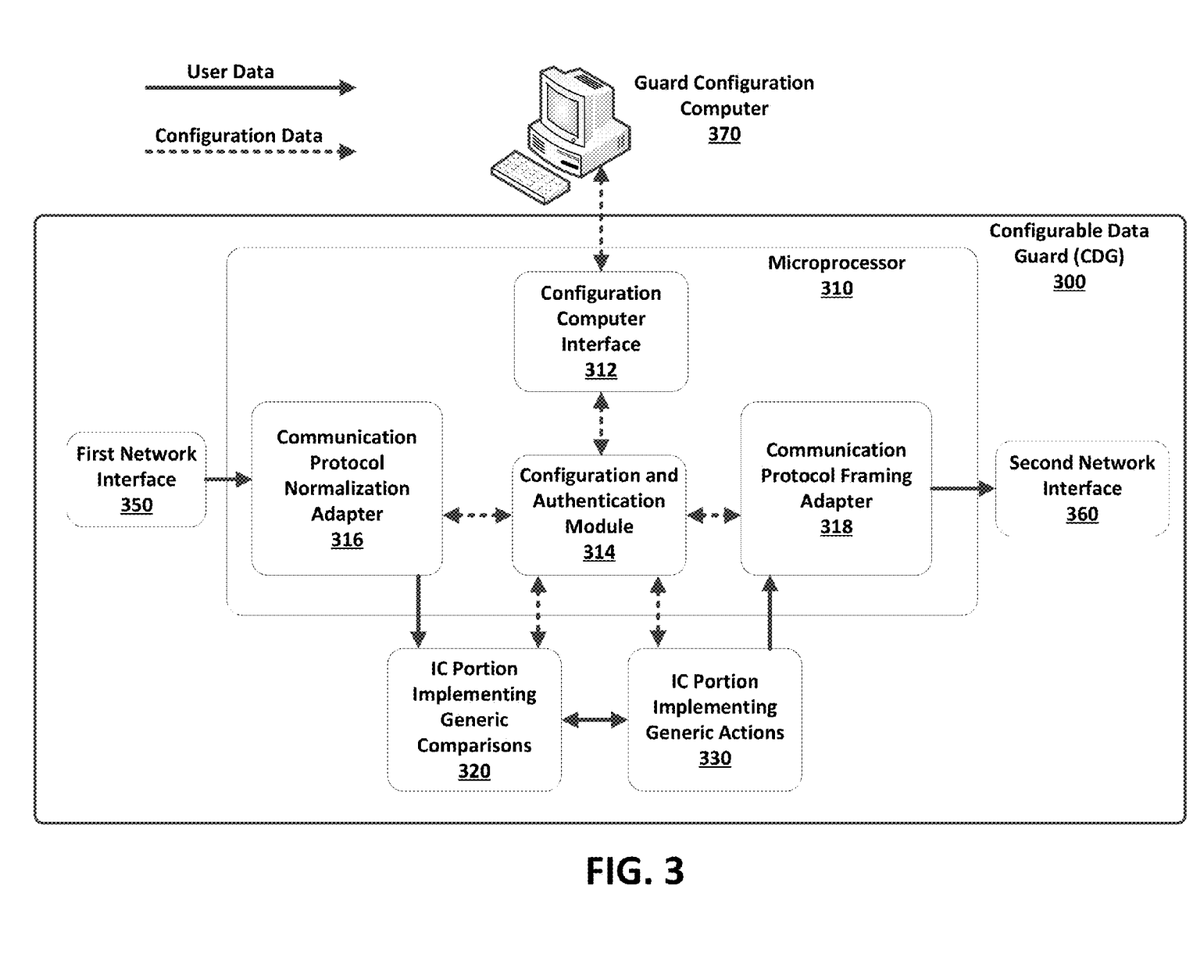
FIG. 3 is a block diagram illustrating an example internal configuration of a hardware-based CDG.

FIG. 3 is a block diagram illustrating an example internal configuration of a hardware-based CDG. For example, CDG 300 may be an FPGA, ASIC, or other PLD. Microprocessor 310 may be a microprocessor defined using an HDL that is preloaded on CDG 300. Microprocessor 310 may be a hardware-based microprocessor configured to implement the configuration and authentication aspects of CDG 300. For example, Microprocessor 310 may include Configuration Computer Interface 312 for interfacing with Guard Configuration Computer 370. Microprocessor 310 may include Configuration and Authentication Module 314. Configuration and Authentication Module 314 may correspond to the portion of Microprocessor 310 that is configured to receive and authenticate the configuration data from Guard Configuration Computer 370. Configuration and Authentication Module 314 may be configured to implement the self-test(s) for the arrays of generic actions and generic comparisons. Microprocessor 310 may include Communication Protocol Normalization Adapter 316 and Communication Protocol Framing Adapter 318. For example, Communication Protocol Normalization Adapter 316 may be configured to remove application and transport layer control plane information from communications received via First Network Interface 350. Communication Protocol Framing Adapter 318 may be configured to re-frame the data after processing by the generic filtering elements. This post-processed data can then be sent to Second Network Interface 360 for transmission.

IC Portion Implementing Generic Comparisons 320 may be a hardware encoded portion of CDG 300 that includes the arrays of generic comparisons that are used to build the implementation specific guard primitives. For example, an HDL may be used to create an integrated circuit that implements the arrays of generic comparisons in hardware. These hardware encoded generic comparisons may correspond to IC Portion Implementing Generic Comparisons 320 in FIG. 3.

IC Portion Implementing Generic Actions 330 may be a hardware encoded portion of CDG 300 that includes the arrays of generic actions that are used to build the implementation specific guard primitives. For example, an HDL may be used to create an integrated circuit that implements the arrays of generic actions in hardware. These hardware encoded generic actions may correspond to IC Portion Implementing Generic Actions 330 in FIG. 3.

When the configuration is loaded into CDG 300, Configuration and Authentication Module 314 may apply the configuration by appropriately connecting specific generic comparisons of IC Portion Implementing Generic Comparisons 320 with appropriate generic actions of IC Portion Implementing Generic Actions 330. Configuration and Authentication Module 314 may also configure Communication Protocol Normalization Adapter 316 to perform appropriate pre-processing of the data to remove control plane information and Communication Protocol Framing Adapter 318 to perform appropriate post-processing of the data to re-attach the control plane information.

Figure 4:
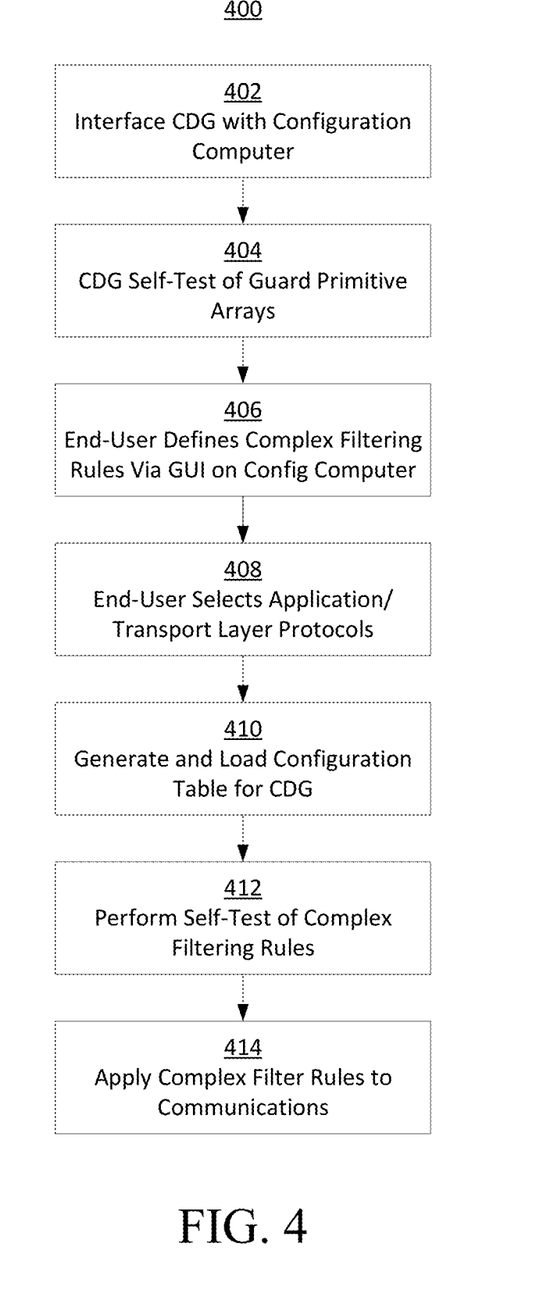
FIG. 4 illustrates an example flow chart for configuring a CDG for use in a tactical application.

FIG. 4 illustrates an example flow chart for configuring a CDG for use in a tactical application. For example, sensor(s) located on a device such as an aircraft, missile, drone etc. may be in communication with a command and control center. The sensor may send data back to the control center via a point-to-point link. The CDG may be used in order to apply certain filter rules to the data being communicated from the sensor to the command and control center. CDG may be inserted between the sensor and the command and control center on the point-to-point link and operation of the CDG may be transparent to devices implementing the communication protocol between sensor and the command and control sensor (e.g., RF transceivers). Prior to implementing the Example Method 400 described in FIG. 4, the CDG may have been pre-configured with the arrays of generic primitives (e.g., arrays of generic comparisons, and generic actions, etc.) using a HDL. Additionally, a microprocessor for implementing normalization pre-processing and/or de-normalization post-processing may be instantiated on CDG, although the specific I/O configuration(s) to be applied may be application-specific and may not yet be loaded onto the device.

At 402, the CDG may be connected to or otherwise interface to a configuration computer. Upon interfacing to the configuration computer, the CDG may receive power and may be configured to operably communicate with a configuration program running on the configuration computer. At 404, the CDG may perform an initial self-test of the guard primitive arrays that were pre-configured on the CDG. For example, the CDG may be tested to ensure that the arrays of generic comparisons are operating according to their designed functionality. The CDG may be tested to ensure that the arrays of generic actions are operating according to their designed functionality. The initial self-test may be performed on these pre-configured components of the CDG independent of the application specific complex filter rules to be added to the CDG via the configuration computer. In some cases, the authenticated configuration data may be stored by the CDG between sessions. For example, the configuration may be stored in non-volatile memory between sessions and may be reloaded when the CDG is re-activated/re-powered up.

At 406, the end-user that is defining the complex filtering rules may use an application running on the configuration computer in order to specify the complex filter rules to be implemented via the CDG. As an example, one or more sensors on a drone device may be configured to collect temperature data at a given time and location. The temperature, time, and location data may be sent back to the command and control center using an XML format using the PPP protocol. In this example, suppose the end-user wants to block the temperature data when the location data corresponds to certain coordinates as well as convert the time data from local time to coordinated universal time UTC. As may be appreciated, these rules are meant for purposes of explanation and many different types of filtering rules may be implemented based on user requirements and/or the format of the data being transmitted.

In this example, the end-user may specify the filter rules to be implemented using the application running on the configuration computer. For example, a graphical user interface (GUI) associated with the application may present the user with a list of supported rules or sub-rules. The configuration application may allow the user to define variables or other expected communication parameters (e.g., the time, temperature, location, etc.). The configuration application may allow the user to specify the rules to be implemented for the user defined parameters. In an example, at 408 the configuration application may allow the user to select the application layer and/or transport layer communications protocols to be utilized for the communications. In the example of FIG. 4, the user may specify that an XML language is to be used at the application level and that PPP is the transport layer protocol. The user may also define how the XML is used to encode the signals of interest.

Once the user has defined the types of rules to be implemented and the application/transport layer protocols, at 410 the configuration application on the configuration computer may generate an implementation specific configuration table to be loaded on the CDG. The configuration table may define the appropriate combination of generic comparisons and generic filters that should be applied in order to implement the complex filter rules. In other words, the configuration table may specify the appropriate hierarchy of guard primitives that should be constructed from the pre-configured, hardware-defined generic guard arrays in order to implement the complex filtering rules. The appropriate I/O configuration for normalizing the pre-processed used data (e.g., the data to input to the CDG to which the filtering rules are being applied) and/or for re-framing/post-processing the filtered user data in order to reconstruct the appropriate application layer and/or transport layer metadata. For example, the configuration data received from the host configuration computer may specify the pre- and/or post-processing rules to be implemented by a microprocessor that is pre-configured on the CDG. In an example, the pre- and/or post-processing rules may be implemented in whole or in part using hardware implemented logic rather than or in addition to being implemented via a microprocessor.

The configuration table may then be loaded onto the CDG. The CDG may be configured to accept the configuration table and appropriately configure the generic guard primitives in order to implement the complex filter rules. Once the configuration has been applied, at 412 a self-test of the configuration including the complex filtering rules may be applied. For example, the configuration computer may generate known answer test data and include the known answer test data with the configuration table. Once the CDG has application-configured guard primitives to implement the complex filter rules, the CDG may input test input data into the configured guard primitives. The CDG may then determine whether the data output from the application-configured guard matches an expected result. In an example, rather than or in addition to the CDG evaluating the result of the known answer test, the result may be fed back to the configuration computer to determine if the complex rules have been properly implemented. Multiple known answer tests may be used and the number and/or complexity of the known answer test may depend on the complexity of the rules to be implemented by the data guard. For example, a known-answer test can be specified for each complex rule to be applied by the CDG.

Once the known answer tests have been successfully completed, at 414 the CDG may begin applying the filter rules to the actual communications. For example, the CDG may be operably connected to a communication network interface on the drone device. For example, the CDG may be operably connected to interface between the sensors on the drone and the radio transceiver. The CDG can then begin applying the complex filter rules as defined by the configuration table. If the CDG is to be reconfigured, the CDG can again be connected to the configuration computer and receive an updated configuration table. The generic primitives can be reconfigured based on the updated configuration table in order to apply the complex filtering rules. In example, the configuration table may be modifiable at the time of use by interfacing the host configuration computer with the CDG while the CDG is connected to the host communication equipment.

Embodiments may take the form of a tangible computer-usable or computer-readable medium providing program code for use by or in connection with a computer or any instruction execution system. Examples of a computer-usable or computer-readable medium include tangible computer media such as semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. A processor may be configured to execute instructions stored in memory to perform the various functions described herein.

Although the concepts and structures disclosed herein have been described with reference to several examples and exemplary embodiments, numerous modifications and variations may be made and still be within the scope described herein. No limitation with respect to any specific example or embodiment is intended to be necessary or mandatory, and the scope of the protection should be plainly apparent based on the language of the following claims.

What is claimed:

1. A configurable data guard (CDG) implemented on a hardware-based programmable logic device, the CDG comprising:
   a first network interface configured to receive data;
   a first integrated circuit portion of the hardware-based programmable logic device, the first integrated circuit portion comprising a plurality of arrays of preconfigured comparison operations;
   a second integrated circuit portion of the hardware-based programmable logic device, the second integrated circuit portion comprising a plurality of arrays of preconfigured action operations;
   a microprocessor configured to:
      receive a data guard configuration,
      perform an authentication and integrity check procedure on the received data guard configuration, and
      configure a plurality of guard primitives based on the data guard configuration, wherein each guard primitive is configured from at least one preconfigured comparison operation from the first integrated circuit portion and at least one preconfigured action operation from the second integrated circuit portion; and
   a second network interface configured to output the data after the data has been processed by the plurality of guard primitives.

2. The CDG as in claim 1, wherein the microprocessor is further configured to normalize the data received via the first network adapter prior to the data being processed by the plurality of guard primitives.

3. The CDG as in claim 2, wherein normalizing the data comprises removing transport layer control plane data and removing application layer control plane data.

4. The CDG as in claim 3, wherein the microprocessor is further configured to re-frame the data after the data has been processed by the plurality of guard primitives.

5. The CDG as in claim 4, wherein re-framing the data comprises re-attaching the application layer control plane data and re-attaching the transport layer control plane data.

6. The CDG as in claim 1, wherein the hardware-based programmable logic device corresponds to one of an application specific integrated circuit (ASIC) or a field programmable gate array (FPGA).

7. The CDG as in claim 1, wherein the microprocessor is further configured to perform a check of the plurality of preconfigured comparison operations and of the plurality of preconfigured action operations at start-up.

8. The CDG as in claim 1, wherein the microprocessor is further configured to perform a known answer test for each of the plurality of guard primitives when configuring the plurality of guard primitives.

9. A method for configuring a configurable data guard (CDG), the method comprising:
   the CDG receiving a data guard configuration from a computing device, wherein the CDG is implemented on hardware-based programmable logic device;
   the CDG performing an authentication and integrity check procedure on the received data guard configuration; and
   the CDG configuring a plurality of guard primitives based on the data guard configuration, wherein each guard primitive is configured from at least one preconfigured comparison operation corresponding to a first integrated circuit portion comprised in the hardware-based programmable logic device of the CDG and at least one preconfigured action operation corresponding to a second integrated circuit portion comprised in the hardware-based programmable logic device of the CDG.

10. The method as in claim 9, wherein the data guard configuration further comprises an input/output (I/O) configuration, and the I/O configuration indicates an application layer protocol utilized by communications to be processed by the CDG and a transport layer protocol utilized by communications to be processed by the CDG.

11. The method as in claim 10, further comprising the CDG configuring a communication protocol normalization adapter to remove control plane data associated with the communications processed by the CDG prior to processing the communications via the plurality of guard primitives.

12. The method as in claim 10, further comprising the CDG configuring a communication protocol framing adapter to re-attach the control plane data associated with the communications processed by the CDG after to processing the communications via the plurality of guard primitives.

13. The method as in claim 9, further comprising:
   the CDG receiving a communication; and
   the CDG processing the communication via the plurality of guard primitives after applying the data guard configuration, wherein user data plane data of the communication is processed via the plurality of guard primitives.

14. The method as in claim 13, wherein control plane data associated with the communications is removed prior to processing the communications via the plurality of guard primitives.

15. The method as in claim 9, wherein the hardware-based programmable logic device that implements the CDG comprises an application specific integrated circuit (ASIC) or a field programmable gate array (FPGA).

16. The method as in claim 9, further comprising:
   the CDG performing a self-check of at least one preconfigured comparison operation and the at least one preconfigured action operation.

17. The method as in claim 9, further comprising:
   The CDG performing at least one known answer test for each of the plurality of guard primitives after applying the data guard configuration.

18. A configurable data guard (CDG) comprising:
   a first integrated circuit portion of the hardware-based programmable logic device, the first integrated circuit portion comprising a plurality of arrays of preconfigured comparison operations;
   a second integrated circuit portion of the hardware-based programmable logic device, the second integrated circuit portion comprising a plurality of arrays of preconfigured action operations; and
   a microprocessor configured to:
      receive a data guard configuration,
      perform an authentication and integrity check procedure on the received data guard configuration, and
      configure a plurality of guard primitives based on the data guard configuration, wherein each guard primitive is configured from at least one preconfigured comparison operation from the first integrated circuit portion and at least one preconfigured action operation from the second integrated circuit portion.

19. The CDG as in claim 18, further comprising:
a first network interface configured to receive a first communication,
a communication protocol normalization adapter configured to remove control plane data from the first communication prior to the first communication being processed via the plurality of guard primitives;
a communication protocol framing adapter configured to re-apply the control plane data to the first communication after the first communication has been processed via the plurality of guard primitives;
a second network interface configured to output the first communication.

20. The CDG as in claim 18, wherein the microprocessor is further configured to:
perform a self-check to test ensure that each preconfigured comparison operation of the plurality of arrays of preconfigured comparison operations is operating correctly prior to applying the data guard configuration; and
perform a self-check to test ensure that each preconfigured action operation of the plurality of arrays of preconfigured action operations is operating correctly prior to applying the data guard configuration.

* * * * *